May 2, 1961  W. E. BLACKBURN ET AL  2,982,408
COLOR DISCRIMINATOR
Filed Sept. 19, 1955  2 Sheets-Sheet 1
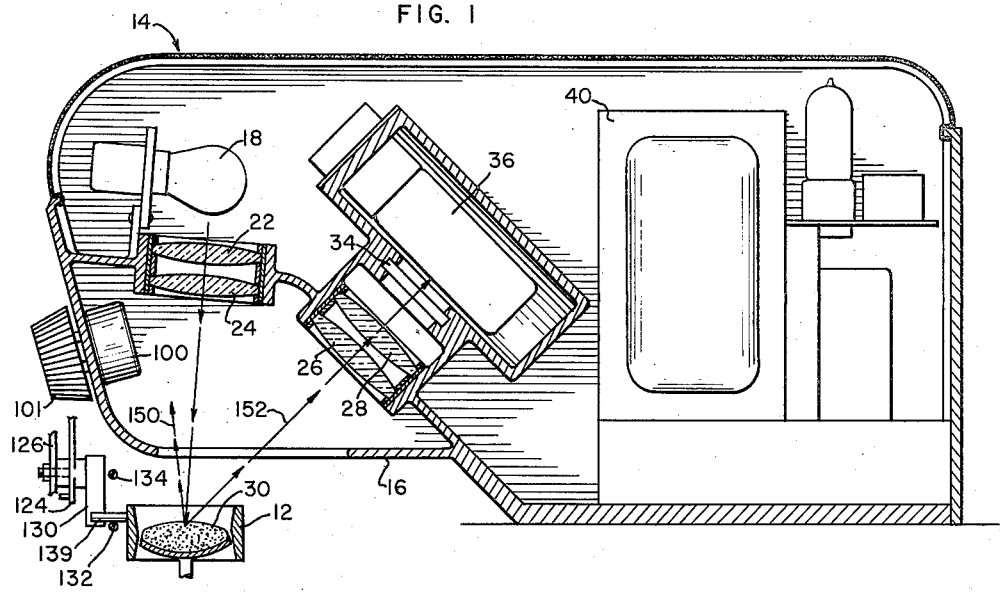
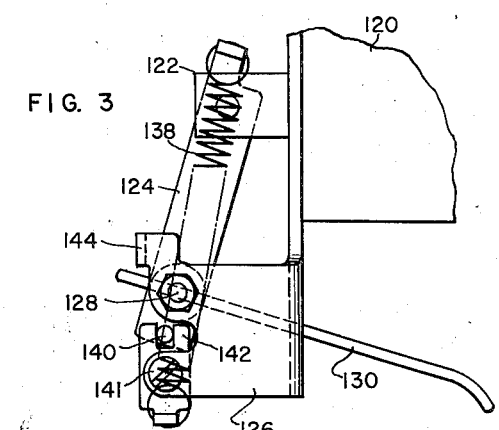
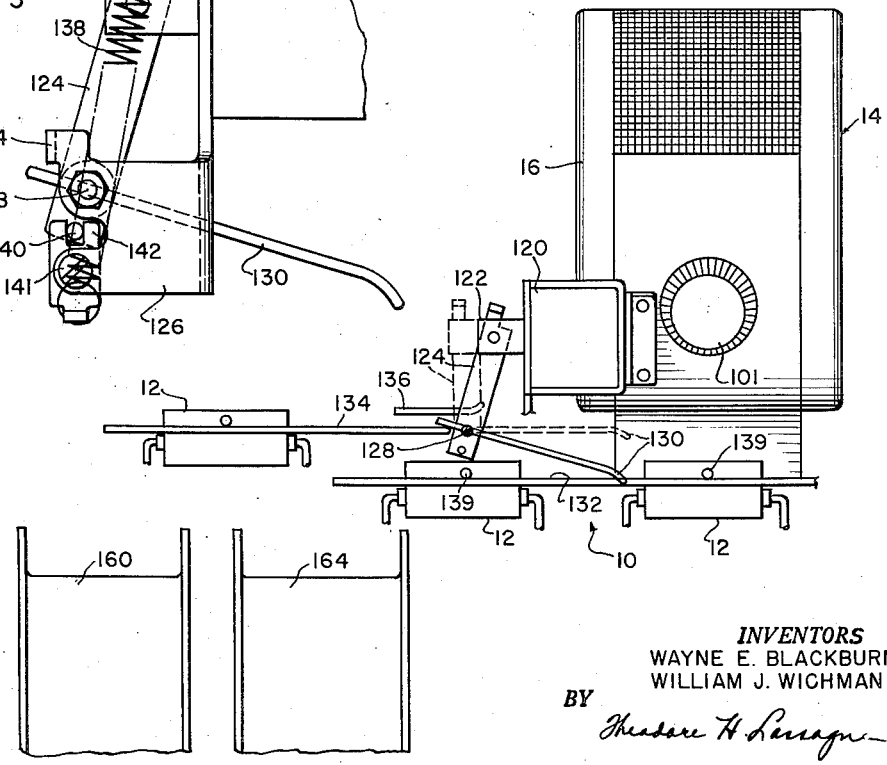
INVENTORS
WAYNE E. BLACKBURN
WILLIAM J. WICHMAN
BY
Theodore H. Lassagne
ATTORNEY May 2, 1961   W. E. BLACKBURN ET AL   2,982,408
COLOR DISCRIMINATOR
Filed Sept. 19, 1955   2 Sheets-Sheet 2

INVENTORS
WAYNE E. BLACKBURN
WILLIAM J. WICHMAN
BY
Theodore H. Lassagne
ATTORNEY

United States Patent Office 2,982,408
Patented May 2, 1961

2,982,408

COLOR DISCRIMINATOR

Wayne E. Blackburn, Burbank, and William J. Wichman, Sun Valley, Calif., assignors to General Precision, Inc., a corporation of Delaware Filed Sept. 19, 1955, Ser. No. 535,054

16 Claims. (Cl. 209—111)

This invention relates to apparatus for discriminating colors and more particularly to apparatus for sorting material such as egg yolks on the basis of differences in the color of the material.

In recent years, considerable advances have been made in lightening the problems and burdens of the housewife in the preparation of food for her family. For example, various cake mixes have been prepared so that a housewife with a minimum amount of effort can bake any of a wide assortment of cakes. Furthermore, various frozen items such as pies and meat courses have also been made available in recent years and can be easily prepared for consumption by merely heating the items.

One of the requirements in the preparation and marketing of food items such as cake mixes and frozen pies is that all of the food items of a particular type have standard qualities. For example, the cake mixes such as for gold cake or orange cake must have standard characteristics of color and taste. One of the basic ingredients in these cake mixes is egg yolk. Differences in the color of the egg yolk may affect the differences in the color of the cake and may even affect the taste of the cake. Various attempts have been made to sort such material as egg yolks on the basis of their color, but these attempts have not been entirely successful.

This invention provides apparatus for discriminating between the color of such food items as egg yolks. The invention includes apparatus for directing a beam of light at an egg yolk and for filtering the light reflected from the egg yolk. Light in the wave length of the visual colors requiring discrimination is prevented from passing through the filter and light in other wave lengths is passed by the filters. This is the reverse of the standard technique. It is used in this invention since it has been found that differences in the degree of yellow or red color in an egg yolk are represented by consderable differences in the degree of the green and blue colors reflected by the egg yolk.

The light passing through the filter is received by a photo tube which is connected to a source of alternating voltage to produce an alternating signal having an amplitude related to the amount of light received by the photo tube. This signal is amplified and introduced to the grid of a gas-filled tube to control the triggering of the tube. Alternating voltage of one phase is introduced to the plate of the gas-filled tube to obtain a conduction of the tube in alternating half cycles and to cut off the tube in the other half cycles. An alternating voltage of opposite polarity is applied between the grid and cathode of the gas-filled tube to normally bias the tube against conduction.

The signals introduced to the gas-filled tube from the photo tube produce a flow of current through the gas-filled tube when the signals have an amplitude above a particular value. The flow of current through the gas-filled tube causes members to be activated which divert the egg yolk into a separate path. In this way, egg yolks having a dark color can be separated from egg yolks having a light color. Means are also included in the apparatus for adjusting the degree of color required to divert the egg yolks into the alternate path.

In the drawings:

Figure 1 is a sectional view somewhat schematically illustrating in elevational relationship one embodiment of the invention for testing material such as egg yolks to provide a discrimination between the color of the material;

Figure 2 is an elevational view somewhat schematically illustrating the apparatus shown in Figure 1 in relationship to apparatus for moving the material such as egg yolks past the testing station and for separating the material on the basis of its color;

Figure 3 is an enlarged view of certain members shown in Figure 2 for providing a separation between different material such as egg yolks and illustrates these members in further detail;

Figure 4:
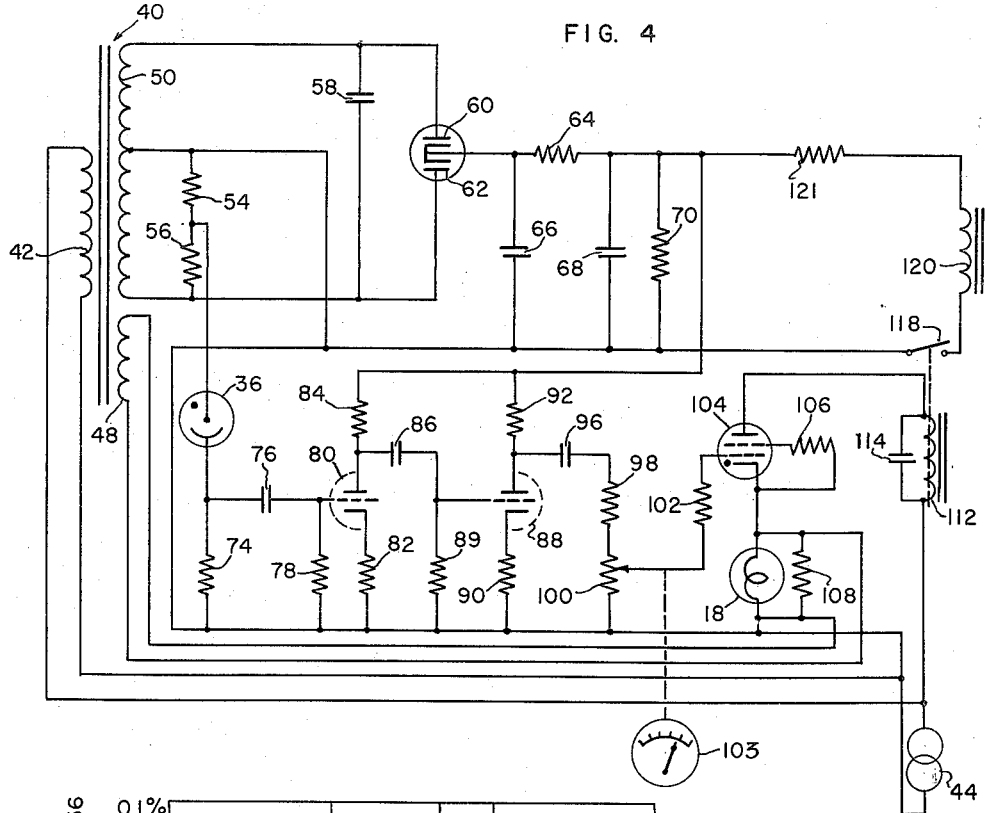
Figure 4 is a circuit diagram somewhat schematically illustrating the electrical features which form a part of the testing apparatus shown in Figures 1 and 2.

In the embodiment of the invention shown in the drawings, a conveyor generally indicated at 10 (Figure 2) includes a plurality of cups 12 disposed along the conveyor at spaced intervals. The conveyor 10 is adapted to be driven by a motor (not shown) at a substantially constant speed so that the cups will move in sequence past testing apparatus generally indicated at 14 in Figures 1 and 2. Each of the cups 12 may be provided with a substantially hollow configuration to hold material including food items such as egg yolks which are to be tested for color by the apparatus 14.

The testing apparatus 14 is mounted within a housing 16 (Figure 1). The apparatus includes a light source 18 for casting a beam of light in a suitable direction such as downwardly at an angle of approximately five degrees from a vertical axis. A lens system formed by a pair of double convex lenses 22 and 24 is disposed between the light source 18 and each of the cups 12 as the cups move past the testing apparatus 14. The lenses 22 and 24 may be obtained from a number of different companies including the Bray Optical Company of Los Angeles.

A lens system formed by a pair of double convex lenses 26 and 28 is disposed at a suitable angle such as approximately 40 degrees with respect to the direction of the beam of light from the source 18. The lenses 26 and 28 may also be obtained from a number of different companies including the Bray Optical Company. The lenses 26 and 28 are adapted to focus the light reflected from an egg yolk 30 held within the cup 12.

A filter 34 is axially aligned with the lenses 26 and 28 at a greater distance from the cup 12 than the lenses. The filter 34 is provided with characteristics for absorbing light in the range of approximately 550 to 700 millimicrons corresponding to the yellow and red colors. The filter 34 is also provided with characteristics for transmitting a high percentage of the light in the range of 400 to 525 millimicrons corresponding to the green and blue colors. The reason for this will be described in detail subsequently. A photo tube 36 is dispposed along the axis of the light diffused from the egg yolk 30 at a distance further from the egg yolk than the filter 34. The photo tube 36 may be a type "1P37" manufactured by the Radio Corporation of America.

The photo tube 36 is included in the circuitry shown in Figure 4. The circuitry also includes a transformer generally indicated at 40 having a primary winding 42 connected to a source 44 of alternating voltage. The source 44 is adapted to supply alternating voltage having a suitable amplitude such as approximately 115 volts and having a suitable frequency such as approximately 60 cycles.

The transformer 40 also includes a secondary winding 48 adapted to supply a suitable voltage such as approximately 6.3 volts and a secondary winding 50. The secondary winding 50 is adapted to supply a suitable voltage such as approximately 300 volts between a center-tapped terminal and each of the upper and lower terminals of the winding in Figure 4. The center tap of the winding 50 may be grounded. The transformer 40 is preferably provided with characteristics for obtaining regulated outputs even with considerable variations in the voltage applied from the source 44 to the primary winding 42. For example, a transformer manufactured by the Sola Transformer Company and designated as type "7104" by that company may be used. This transformer is adapted to provide a substantially constant voltage even when the potential from the source 44 varies between such limits as 90 and 125 volts.

A pair of resistances 54 and 56 are in series between the center tap of the secondary winding 50 and the lower terminal of the winding in Figure 4. The upper and lower terminals of the winding 50 in Figure 4 are connected to the opposite terminals of a capacitance 58 having a suitable value such as approximately 0.1 microfarad and are also connected to the plates of a pair of diodes 60 and 62. The diodes 60 and 62 may be included within one envelope, such as in a "6X4" tube.

Connections are made from the cathodes of the diodes 60 and 62 to first terminals of a resistance 64 having a suitable value such as approximately 2500 ohms and of a capacitance 66 having a suitable value such as approximately 20 microfarads. The resistance 64 in turn has a common connection with a parallel arrangement formed by a capacitance 68 and a resistance 70. The capacitance 68 and the resistance 70 may respectively have suitable values such as approximately 20 microfarads and 15,000 ohms. Second terminals in the capacitances 66 and 68 and the resistance 70 are connected to the center tap of the secondary winding 50.

The common terminal between the resistances 54 and 56 is connected to the plate of the photo tube 36. The cathode of the photo tube 36 is connected to one terminal of a resistance 74, the other terminal of which has a common connection with the center tap of the secondary winding 50. A coupling capacitance 76 and a resistance 78 are in series across the resistance 74. The capacitance 76 may be a suitable value such as approximately 0.22 microfarad, and each of the resistances 74 and 78 may have suitable values such as approximately 4.7 megohms.

The voltage on the common terminal between the capacitance 76 and the resistance 78 is applied to the grid of a tube 80 having its cathode connected through a suitable resistance 82 to the center tap of the secondary winding 50. The plate of the tube 80 is adapted to receive voltage through a suitable resistance 84 from the common terminal between the resistance 64 and the capacitance 68. The resistances 82 and 84 may respectively have values of approximately 3900 and 100,000 ohms.

The signals on the plate of the tube 80 are introduced through a suitable coupling capacitance 86 to the grid of a tube 88. The tubes 80 and 88 may be included within one envelope and may be identified as type "12AU7." Resistances 89 and 90 are respectively connected at one end to the grid and the cathode of the tube 88 and are connected at the other end to the center tap of the secondary winding 50. The resistances 89 and 90 may have values of approximately 470,000 and 8200 ohms, respectively. A connection is made from the plate of the tube 88 to one terminal of a resistance 92 having its other terminal connected to the common terminal between the resistance 64 and the capacitance 68. The resistance 92 may have a suitable value such as approximately 100,000 ohms.

A coupling capacitance 96, a resistance 98 and a potentiometer 100 are in series between the plate of the tube 88 and the center tap of the winding 50. The potentiometer 100 is mounted in the housing 16 in a manner similar to that shown in Figure 1 such that the movable contact of the potentiometer may be manually adjusted as by a knob 101 at the front of the housing 16. The capacitance 96, the resistance 98 and the potentiometer 100 may respectively have values of approximately 0.1 microfarad, 750,000 ohms and 250,000 ohms. The movable contact of the potentiometer 100 may be mechanically ganged to the indicator of a meter 103 to provide a visual and calibrated indication in wave lengths of the position of the movable contacts. The movable contact of the potentiometer 100 is also electrically connected to one terminal of a resistance 102 having a suitable value such as approximately one megohm. The other terminal of the resistance 102 is connected to the control grid of a gas-filled tube such as a type "2D21."

The screen grid of the gas-filled tube 104 is connected through a suitable resistance 106 to the cathode of the tube. The resistance 106 may have a suitable value such as approximately two megohms. The cathode of the tube 104 has a common connection with the secondary winding 48 of the transformer 40 and with the filaments of the various tubes including the tubes 60, 62, 80, 88 and 104. These filaments are indicated schematically in Figure 4 by a resistance 108. The other terminals of the winding 48 and the tube filaments are connected to the center tap of the secondary winding 50.

Connections are made from the plate of the gas-filled tube 104 to one terminal of a solenoid 112 and a capacitance 114. The capacitance 114 may have a suitable value such as approximately four microfarads and the solenoid 112 may be a type "223-7" manufactured by the Leach Relay Company of Los Angeles, California. As will be described in detail subsequently, the solenoid 112 is a direct current type which is connected in the circuit to receive alternating line voltage. The other terminals of the solenoid 112 and the capacitance 114 are connected to one terminal of the voltage source 44.

The solenoid 112 is adapted when energized to act upon a switch 118 to close the switch. The switch 118 is connected with a solenoid 120 in a circuit which is adapted to receive the voltage developed across the capacitance 68. A resistance 121 may be connected in the circuit to limit the flow of current through the solenoid 120. An armature 122 is in turn magnetically coupled to the solenoid 120.

The armature 122 is pivotably coupled to one end of a linkage 124 so that the linkage can pivot between the positions shown in solid and broken lines in Figure 2 in accordance with the operation of the armature. At its other end, the linkage 124 is attached to a bracket 126 (Figure 3) as by a pivotable pin 128. An arm 130 is also carried by the pin 128 for pivotal movement into the position shown in solid or broken lines in Figure 2 in accordance with the operation of the armature 122. The arm 130 controls the movements of the cups 12 in either a path 132 or a path 134 in accordance with its pivotal disposition. The arm 130 and the linkage 124 in effect form a bell crank lever having a fulcrum on the pin 128 such that the arm and linkage experience similar pivotal movements.

The pivotal movement of the linkage 124 and the arm 130 is controlled by the inclusion of certain members shown in Figures 2 and 3. One of these members is a reaction member 136 (Figure 2) disposed in contiguous relationship to the arm 130 in the alternate position of the arm indicated in solid lines in Figures 2 and 3. In this position of the arm 130, an actuating rod 139 carried by the cup 12 undergoing test is guided by the arm for movement to the reaction member 136. The rod 139 cooperates with the reaction member 136 to act upon the arm 130 in a manner which will be disclosed in detail subsequently.

A spring 138 disposed in constrained relationship between the bracket 126 and the upper end of the linkage 124 is another of the members controlling the pivotal movement of the linkage and the arm 130. A pin 140 is also included and is disposed between the legs of a yoke member 142 suitably attached to the bracket 126 as by a screw 141. A stop 144 may also be provided on the bracket 126 to limit the pivotal movement of the linkage 124 and the arm 130 in a counterclockwise direction.

To obtain a proper operation of the testing apparatus, the egg yolks 30 are first removed from their shells and placed in the cups 12 such that one yolk 30 is placed in each cup. This may be performed manually or preferably it may be performed automatically by machine. After the egg yolks 30 have been placed in the cups 12, the cups 12 are carried by the conveyor 10 to a position for receiving a beam of light from the source 18. This light beam is focussed by the lenses 22 and 24 and is directed toward each egg yolk 30 for reflection and diffusion by the yolk. The beam of light is directed at a suitable angle such as approximately five degrees to the vertical so that the specular light will be reflected in a direction which does not affect the operation of the testing apparatus shown in Figures 2 and 3. The specular light is indicated by broken lines at 150 in Figure 1.

Figure 5:
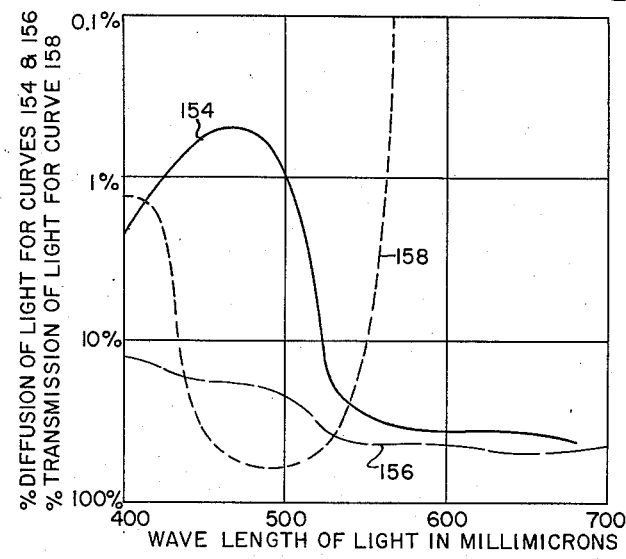
Figure 5 shows a plurality of curves representing the light characteristics of different egg yolks and the operation of a filter shown in Figure 1 for passing light only in a particular range of wave lengths.

Light diffused from the egg yolks 30 travels in a direction indicated by broken lines at 152 and passes through the lenses 26 and 28 to receive a proper focus. The light then passes to the filter 34, which prevents the passage of light in the range of yellow and red colors as represented by the 550 to 700 millimicron range. However, light in the range of blue and green colors passes through a filter 34 as represented by the 400 to 525 millimicron range. The operation of the filter 34 in passing light in the 400 to 525 millimicron range and in trapping light in the 550 to 700 millimicron range is illustrated in broken lines by a curve 158 in Figure 5. The light then passes to the photo tube 36 and produces in the photo tube a signal related to the intensity of light passing to the photo tube, as will be described in detail subsequently.

It has been found that the intensity of light obtained by diffusion from an egg yolk 30 in the 550 to 700 millimicron range does not vary greatly even with considerable difference in the color of the yolk. For example, the relative intensity of the light obtained by diffusion at different wave lengths from a dark yolk is indicated in solid lines by a curve 154 in Figure 5. Similarly, the relative intensity of the light obtained by diffusion in different wave lengths from a light yolk is indicated in broken lines by a curve 156 in Figure 5. As will be seen, the difference between the curves 154 and 156 is not very great in the region of 550 to 700 millimicrons, as represented by the yellow and red colors. However, a considerable difference in the intensities of the diffused light occurs in the region of 400 to 525 millimicrons, as represented by green and blue colors.

Since the difference in the intensities of the light diffused from light and dark yolks is not very great in the range of approximately 550 to 700 millimicrons, it is desirable to trap the light in this range of wave lengths. By trapping the yellow and red light, the differences in the intensities of the light obtained by diffusion from different yolks tend to become magnified. This results from the fact that the light intensities from the yellow and red colors cannot cloud the considerable differences in intensity in the blue and green regions. In this way, light yolks can be distinguished from dark yolks by measuring the relative intensities of the light obtained by diffusion from the yolks in the green and blue range. The distinction between light and dark yolks is further enhanced because the amount of light diffused from the egg yolks in the range of approximately 550 to 700 millimicrons is considerably greater than the amount of light diffused from the yolks in the range of approximately 400 to 525 millimicrons. This may be seen from the curves 154 and 156 in Figure 5.

The light passing through the filter 34 is introduced to the photo tube 36 to produce corresponding signals in the photo tube. These signals are produced only in the alternating half cycles in which a positive voltage is produced in the lower half of the secondary winding 50. The positive voltages are introduced in alternate half cycles to the plate of the photo tube 36 from the common terminal between the resistances 54 and 56 in order to maintain the amplitude of the alternating voltage at a moderate amplitude. In the positive half cycles of alternating voltage, current flows through a circuit including the photo tube 36, the resistance 74 and the resistance 54. This current has an amplitude dependent upon the intensity of light passing to the photo tube 36 and upon the amplitude of the alternating voltage introduced to the photo tube. However, as described above, the amplitude of the alternating voltage introduced to the photo tube 36 is substantially constant even with considerable changes in the potential from the source 44. This causes an alternating signal having an amplitude dependent substantially only upon the intensity of the light passing through the filter 34 to be produced on the cathode of the photo tube in the positive half cycles of line voltage.

The alternating signals produced on the cathode of the photo tube 36 are introduced through the coupling capacitance 76 to the grid of the tube 80 to produce a corresponding flow of current through the tube. This current flows through a circuit including the capacitance 68, the resistance 84, the tube 80 and the resistance 82. Because of the voltage drop produced across the resistance 84, the current flowing through the above circuit produces at the plate of the tube 80 an alternating signal having an amplitude which decreases as the amplitude of the signal from the photo tube 36 increases.

The voltage on the plate of the tube 80 is in turn applied through the coupling capacitance 86 to the grid of the tube 88. Since the signal introduced to the grid of the tube 88 is negative, it tends to cut off the flow of current through the tube. In this way, a positive signal having an amplitude directly related to the amplitude of the signal from the photo tube 36 is produced on the plate of the tube 88. The tubes 80 and 88 and their associated circuitry may be provided with characteristics to amplify the signals from the photo tube 36 in a total ratio of approximately 100:1.

The alternating voltage produced on the plate of the tube 88 is applied to the series branch formed by the capacitance 96, the resistance 98 and the potentiometer 100. Only an alternating voltage is able to pass to the resistance 98 and the potentiometer 100 because of the action of the capacitance 96. The potentiometer 100 receives a proportionate amount of this alternating voltage in accordance with the ratio between its value and that of the resistance 98. The voltage developed across the potentiometer 100 is in turn divided in a ratio dependent upon the positioning of the movable contact in the potentiometer with respect to the two stationary contacts the potentiometer so as to produce a proportionate voltage on the movable contact of the potentiometer.

The alternating voltage produced on the movable contact of the potentiometer 100 is introduced to the grid of the gas-filled tube 104. The tube 104 is normally cut off because an alternating voltage is applied from the secondary winding 48 between the grid and cathode of the tube in phase opposition to the alternating voltage applied from the voltage source 44 between the plate and cathode of the tube. The phase opposition causes the voltage on the grid of the tube 104 to swing negative in the half cycles of voltage during which a positive voltage is applied to the plate of the tube. The negative swing of voltage on the grid of the tube 104 prevents the tube from normally being conductive even though the tube might become otherwise conductive because of the positive voltage applied to the plate of the tube.

The voltage produced on the movable contact of the potentiometer 100 has a phase corresponding substantially to the phase of the voltage applied between the plate and the cathode of the tube. For this reason, the tube 104 becomes conductive when the alternating voltage produced on the movable contact of the potentiometer 100 has an amplitude above a particular level. Upon the triggering of the tube 104 into a state of conductivity, the tube remains conductive for the remainder of the half cycle in which a positive voltage is introduced to the plate of the tube. In the next half cycle, a negative potential is applied to the plate of the tube 104 from the voltage source 44 to cut off any flow of current through the tube.

During the half cycles in which the tube 104 is conductive curent flows through a circuit including the voltage source 44, the solenoid 112, the tube 104 and the secondary winding 48. The current energizes the solenoid 112 so that the solenoid actuates the switch 118 into a position of closure. The current also charges the capacitance 114 since the capacitance is connected in parallel with the solenoid 112. After the flow of current through the tube 104 has become interrupted in the negative half cycles of voltage from the source 44, the capacitance 114 discharges through the solenoid 112. This tends to prolong the time during which the solenoid activates the switch 118 into a position of closure. In this way, an activation of the switch 118 into a position of closure is insured.

When the switch 118 closes, current flows through a circuit including the capacitance 68, the resistance 121, the solenoid 120 and the switch. This current causes the solenoid 120 to attract the armature 122 in a direction for producing a pivotal movement of the linkage 124 in a clockwise direction in Figures 2 and 3. The pivotal movement of the linkage 124 in a clockwise direction produces a corresponding pivotal movement of the arm 130, since the linkage 124 and the arm 130 effectively form a vell crank lever pivotable on a fulcrum corresponding to the pin 128. This causes the arm 130 to become coupled to the path 132 so as to provide a diversion from the path 132 to the path 134 of the cup 12 holding the egg yolk 30 undergoing test. By diverting the cup 12 to the path 134, the egg yolk 30 in the cup becomes eventually deposited in a receptacle 160 in Figure 2. The egg yolk 30 undergoing test becomes deposited in the receptacle when the cup 12 becomes pivoted by the operation of suitable apparatus (not shown).

As the cup 12 holding the egg yolk 30 undergoing test moves along the arm 130, it eventually reaches the position at which the arm 130 and the reaction member 136 are contiguous to each other. This causes the rod 139 to press downwardly on the arm 130 at the left end of the arm for the initiation of a counterclockwise movement of the arm on the pin 128 as a fulcrum. The linkage 124 follows the pivotal movement of the arm 130 and moves the armature 122 toward the left in Figures 2 and 3.

When the linkage 124 starts to pivot in a counterclockwise direction in Figure 1, it carries the top end of the spring 138 with it toward the left in Figures 2 and 3. At the same time, the bottom portion of the spring 128 tends to move toward the right, since it is attached to the yoke member 142. The reason for this is that the yoke member pivots in a clockwise direction because of the movement of the pin 140 and because of the action of the pin on the yoke member 142 through the legs of the yoke member. The movement of the spring 138 causes the spring to assume a dynamic position such that it acts on the arm 124 to continue the pivotal movement of the arm until it abuts the stop 144.

In this way, the arm 130 assumes the position shown in broken lines in Figure 2 by the time that the next cup 12 reaches the testing position. When the egg yolk 30 in this second cup 12 is tested by the apparatus 14, it may cause a signal of relatively low intensity to be produced as a result of the diffusion of light from the egg yolk. This would prevent the tube 104 from becoming triggered and the solenoids 112 and 120 from becoming energized. Since the solenoid 120 is not energized, the arm 130 would remain in the position indicated in broken lines in Figure 2. Because of this disposition of the arm 130, the egg yolk 30 in the second cup 12 would continue on the path 132 so as to become deposited in a receptacle 164.

In like manner, a third cup 12 holding the next egg yolk to be tested subsequently passes by the apparatus 14. The light diffused from this egg yolk is used by the testing apparatus 14 to produce a control signal. When the control signal has a sufficient amplitude, it triggers the tube 104 (Figure 4) into a state of conductivity such that the solenoids 112 and 120 become energized. When the solenoid 120 becomes energized, it actuates the armature 122 and causes the arm 130 to be pivoted in a clockwise direction to the position shown in solid lines in Figures 2 and 3. The arm 130 is in a stable position at the end of its clockwise movement since the spring 138 is in a balanced condition. In this way, the egg yolk 30 in the third cup 12 becomes diverted for movement along the path 134 and becomes deposited in the receptacle 160.

It will be seen from the above discussion that the alternating signal produced on the movable contact of the potentiometer 100 controls the movement of the cups 30 in the normal path 132 or in the alternate path 134. When the signal produced on the movable contact of the potentiometer 100 has an amplitude less than a particular value, the tube 104 remains cut off and in turn prevents the solenoid 112 from becoming energized. This causes the egg yolk 30 being tested to continue in its normal path 132. Only egg yolks having a relatively dark color as represented by the curve 154 produce signals of sufficiently low intensity on the movable contact of the potentiometer 100 to cause the egg yolks to continue in the normal path 132.

The egg yolks having relatively light colors cause signals of relatively large amplitude to be produced on the movable contact of the potentiometer 100 in comparison to the amplitude of the signals produced by the egg yolks having dark colors. This is in accordance with the relatively large reflection of light indicated by the curve 156 in Figure 5 for eggs with yolks of light color in comparison to the reflection of light for eggs with yolks of dark color. The signals of large amplitude on the movable contact of the potentiometer 100 for eggs with yokes of light color trigger the tube 104 into a state of conductivity and cause the solenoids 112 and 120 to become energized. When the solenoid 120 becomes energized, it acts on the armature 122 to produce a pivotal movement of the arm 130 into a position for completing the path 134. In this way, the egg yolks 30 of relatively light color are diverted for movement along the path 134 whereas the eggs with yolks of dark color are not diverted for movement along the path 134.

It will be seen that the positioning of the movable contact of the potentiometer 100 controls the degree of color in the egg yolks required to divert the egg yolks from the path 132 to the path 134. For example, when the movable contact of the potentiometer 100 is adjusted to increase the voltage on the movable contact, egg yolks 30 become diverted to the path 134 when they have a darker shade of color than the shade previously required to divert them. In like manner, the egg yolks 30 must have a lighter shade to become directed into the path 134 when the movable contact of the potentiometer 100 is moved in a direction to decrease the amplitude of the signals on the movable contact. It will thus be seen that variations in the positioning of the movable contact of the potentiometer 100 effectively produce shifts along the horizontal axis of the curves shown in Figure 5. This results from the fact that a shift occurs in the wave lengths at which the egg yolks become diverted from the path 132 to the path 134.

It should be appreciated that the switch 118 in Figure 4 can be normally closed and can be opened when the solenoid 112 is energized. By maintaining the switch 118 normally closed, the solenoid 120 would be normally energized and the egg yolks 30 would be normally directed for movement along the path 134. When the switch 118 became opened by the operation of the solenoid 112, the solenoid 120 would become de-energized and the egg yolks would be diverted for movement along the path 132.

The apparatus described above has certain important advantages. It provides a sharp discrimination between the apparent or visual colors of such items as egg yolks by using the light diffused from the yolks only in the range in which great differences in the intensity exist. These great differences in intensity occur in a range of wave lengths different from the wave lengths of the apparent or visual colors actually being tested.

By trapping the light in the wave lengths of the apparent or visual colors actually being tested, the differences in the intensity of the diffused light in the other wave lengths tend to become magnified. This tends to produce a sharp discrimination between the various materials being tested for color. The sharp discrimination is further enhanced because the intensity of the wave lengths being trapped is considerably greater than the intensity of the wave lengths being used in the testing apparatus. This may be seen from the curves 154 and 156 in Figure 5 by a comparison of the amount diffused from an egg yolk in the range of 550 to 700 millimicrons relative to the amount of light diffused from the yolk in the range of 400 to 525 millimicrons.

The apparatus described above has other important advantages. It provides members including the variable potentiometer 100 for obtaining a relatively easy adjustment in the color point at which the material being tested is diverted from a normal path to an alternate path. The apparatus is also advantageous in providing members including the tube 104 for obtaining a sharp discrimination in the colors of different materials. The tube 104 operates to provide a sharp discrimination because of the alternating bias applied to the grid of the tube in phase opposition to the alternating voltage applied to the plate of the tube. This phase opposition is effective in maintaining the tube normally non-conductive so that the tube can become conductive only upon the introduction to its grid of a signal having an amplitude greater than a particular value.

What is claimed is:

1. Apparatus for discriminating between the visual color of bodies such as egg yolks, including, means for passing light to the bodies, means for receiving light from the bodies, means including a filter for preventing the passage of wavelengths of light corresponding to the visual color to be descriminated and for passing light in a particular range of wavelengths on one side of the wavelengths representing the visual colors to be discriminated, means responsive to the light in the range of wavelengths passed to produce a first signal for visual colors having first characteristics in the filtered range of wavelengths and to produce a second signal for visual colors having second characteristics in the filtered range of wavelengths, means for providing first and second paths, means responsive to the first and second signals to produce a movement of the bodies along the first and second paths in accordance with the first and second characteristics of visual color for the bodies, and means triggered by the passage of each body along the second path to prepare the next body for movement along the first path upon the occurrence of the first visual characteristics in the next body.

2. Apparatus as set forth in claim 1, including, means for adjusting the production of the first signals and for obtaining corresponding adjustments in the production of the second signals to vary the visual colors at which the bodies being tested become separated into the first and second categories.

3. Apparatus for discriminating between the apparent colors of bodies such as egg yolks, including, means for directing light at the bodies, means for filtering the light diffused from the bodies to pass light in a particular range of wavelengths less than the apparent colors requiring discrimination and to trap the light in the wavelengths of the apparent colors requiring discrimination, means for producing signals having characteristics dependent upon the light energy in the wavelengths passed by the filtering means, means for providing first and second paths, means including a member pivotable into first and second positions to guide the bodies being tested along the first and second paths, means triggered by the signals for controlling the disposition of the pivotable member in the first and second positions in accordance with the characteristics of the signals, and means operative in accordance with a movement of the bodies being tested along the second path to return the pivotable member to the first position for the next bodies being tested.

4. Apparatus for discriminating between the color of bodies such as egg yolks, including, means for passing light to the bodies requiring discrimination, means for filtering the light travelling from the bodies to trap the light in the wavelength corresponding to the color requiring discrimination and to pass the reflected light in a particular range of wavelengths on one side of the trapped wavelengths, means for detecting any differences between the amount of energy in the wavelengths of light passed by the filtering means for the various bodies being tested and for producing control signals having amplitudes representing such differences for such bodies, and triggering means including means biased to cut-off for signals having amplitudes less than a particular value for receiving the last mentioned signals and for producing output signals only upon the occurrence of control signals having amplitudes greater than a particular value, to provide a distinction between the bodies in accordance with the color of the bodies.

5. Apparatus for discriminating between the visual color of bodies such as egg yolks, including means for passing light toward the bodies, filtering means disposed in the path of the light travelling from the bodies for trapping light in the wavelengths of the visual colors requiring discrimination and for passing the light over a particular range of wavelengths less than the wavelengths of the visual colors requiring discrimination, means for producing an alternating voltage, a photo tube disposed to receive the light passing through the filtering means and coupled electrically to the voltage means to produce a pulsating signal having an amplitude related to the amount of light reaching the photo tube, gas-filled means normally biased to prevent the flow of current and having a cathode, a grid and a plate, means coupled to the alternating voltage means and to the gas-filled means for introducing alternating voltage between the grid and cathode of the gas-filled means and of an opposite polarity between the plate and cathode of the gas-filled means to bias the gas-filled means against conduction, means coupled to the alternating voltage means and to the gas-filled means for introducing the pulsating signal from the photo tube between the grid and the cathode to produce a triggering of the gas-filled means into a state of conduction only for signals having an amplitude greater than a particular value, and means coupled to the gas-filled means and responsive to the pulsating signal for introducing to the grid of the gas-filled means to obtain a flow of current for pulsating signals having an amplitude greater than the particular value and to obtain a cut-off of any flow of current through the gas-filled means after a half cycle of alternating voltage, and to provide a distinction between the bodies in accordance with the visual color of the bodies.

6. Apparatus for discriminating between the color of bodies such as egg yolks, including, means for directing light at the bodies, means for filtering the light travelling from the bodies to cut off light in the wavelengths corresponding to the colors requiring discrimination and to pass the light over a range of wavelengths on one side of the wavelengths of the colors requiring discriminations and having energy patterns related to the colors requiring discrimination, means for producing an alternating voltage, a photo tube disposed to receive the light passing through the filtering means and coupled to the voltage means and to receive the alternating voltage for the production of a pulsating signal having an amplitude related to the energy passing through the filtering means and for the production of the signal in alternate half cycles of the alternating voltage and means controlled by the pulsating signal from the photo tube and biased by the alternating voltage in an opposite polarity to the pulsating signal from the photo tube for preventing the formation of an output signal for pulsating signals having an amplitude within a first range of values and for producing an output signal for pulsating signals having an amplitude greater than the range, and for producing the output signals in alternate half cycles and for returning to a neutral state in the other half cycles to provide a distinction between the bodies in accordance with the color of the bodies.

7. Apparatus for discriminating between the apparent color of bodies, such as egg yolks, including, means for providing a pulsating signal having an amplitude related to the amount of light energy travelling from the bodies over a range of wavelengths less than the wavelengths of the apparent colors requiring discrimination, a gas-filled tube having a cathode, grid and plate, means coupled to the tube for applying an alternating voltage between the plate and cathode of the tube to obtain a flow of current through the tube in alternate half cycles and to cut off any flow of current through the tube in the other half cycles, means coupled to the tube for applying an alternating voltage between the grid and cathode of the tube in a phase opposite to that of the voltage applied to the plate to maintain the tube normally non-conductive, and means responsive to the pulsating signal and coupled to the tube for introducing the pulsating signal between the grid and cathode of the tube to produce a flow of current through the tube in alternate half cycles for a pulsating signal having an amplitude greater than a particular value, to provide a distinction between the bodies with first particular apparent colors and the bodies with second particular apparent colors different from the first particular apparent colors.

8. Apparatus for discriminating between the visual colors of bodies such as egg yolks, including, means for directing light at the bodies, means for filtering the light travelling from the bodies to prevent the passage of light in the wave lengths of the visual colors requiring discrimination and to pass the light in a particular range of wave lengths less than the visual colors requiring discrimination, means including cyclic voltage means responsive to the light passed by the filter means for producing pulsating signals having amplitudes dependent upon the amount of light passed by the filter means in the particular range and having a different amplitude for bodies with foreign material than for bodies without the foreign material and for producing such pulsating signals in alternating half cycles of the cyclic voltage to obtain a re-set of the signal means to a neutral state in the other half cycles, and means responsive to the signals from the last mentioned means and biased to produce a current conduction for pulsating signals having amplitudes greater than a particular value in the alternating half cycles and to prevent a current conduction for signals having amplitudes less than the particular value in the alternate half cycles for a discrimination between the bodies in accordance with the visual color of the bodies.

9. Apparatus as set forth in claim 8, including, means responsive to the pulsating signals and coupled to the biased means for varying the amplitudes of the pulsating signals at which the biased means become conductive to obtain corresponding variations in the bodies distinguished according to colors.

10. Apparatus for discriminating between apparent colors of bodies, such as egg yolks, including, means for directing light at the bodies for diffusion from the bodies; means for filtering the diffused light to trap light in the wavelengths of apparent colors requiring discrimination and to pass light over a particular range of wavelengths less than the wavelengths of the apparent colors requiring discrimination and to pass light over a particular range of wavelengths less than the wavelengths of the apparent colors requiring discrimination and to pass light over a particular range of wavelengths less than the wavelengths of the apparent colors requiring discrimination; means for producing an alternating voltage; a photo tube disposed to receive the light passing through the filter means and coupled electrically to the voltage means to produce, only in alternate half cycles of the alternating voltage, a pulsating signal having an amplitude dependent upon the amount of light energy passing through the filter means and having a different amplitude for bodies with first particular apparent colors than for bodies with second particular apparent colors different from the first apparent colors; and means normally responsive to the pulsating signal and biased to cut-off by the signals from the alternating voltage means in an opposite polarity to the introduction of the pulsating signal to produce a flow of current only upon the production of a pulsating signal having an amplitude greater than a particular value in the alternating half cycles of voltage for a discrimination between bodies with the first particular apparent colors and bodies with the second particular apparent colors.

11. Apparatus as set forth in claim 10, including, means responsive to the pulsating signals and coupled to the biased means for varying the amplitude of the pulsating signal at which the biased means produce a flow of current to obtain corresponding variations in the amount of light energy required to produce a distinction between the bodies being tested as to apparent colors.

12. A method of discriminating between eggs on the basis of their visual colors, including the steps of: directing light at the eggs for diffusion by the eggs, trapping the light diffused from the eggs in the range of visual colors being tested and passing the light in a particular range on one side of the range of visual colors being tested, testing the light passed in the particular range to determine the intensity of this light, and providing a discrimination between the different eggs in accordance with the intensity of the light passed in the particular range for these eggs.

13. A method of discriminating between different eggs on the basis of their apparent colors, including the steps of: directing light at the eggs for diffusion by the eggs, filtering the light diffused from the eggs to pass only the light in a particular range of colors on one side of the apparent colors requiring discrimination, testing the light passed in the particular range to determine its intensity, and separating the eggs having an intensity of light passed greater than a particular intensity from the eggs having an intensity of light passed less than the particular intensity.

14. A method of discriminating between different eggs on the basis of their visual colors, including the steps of: directing light at the eggs for diffusion by the eggs, trapping the diffused light in the wavelengths of the color of the blood spots and passing the diffused light in a particular range less than the wavelengths of the color of the blood spots, providing a reference to determine the intensity of the light passed in the particular wave length, and separating the eggs having an intensity passed of light in the particular range greater than the particular intensity from the eggs having an intensity of passed light in the particular range less than the particular intensity.

15. Apparatus for discriminating between the color of bodies such as egg yolks, including, means for passing light toward the bodies, filtering means disposed in the path of the light travelling from the bodies to trap the light in the wavelengths of the colors requiring discrimination and to pass the light over a particular range of wavelengths less than the wavelengths of the colors requiring discrimination, means for providing an alternating voltage, means including a photo tube responsive to the light passing through the filtering means and connected in a circuit with the alternating voltage means for producing a signal having an amplitude related to the amount of light passing through the filtering means and for producing the signal only in alternate half cycles of the alternating voltage to obtain a different signal amplitude for the bodies with first particular colors than for the bodies with second particular colors different from the first particular colors, and means normally biased to cut-off by the alternating voltage means and connected to receive the signals from the photo tube in an opposite polarity to the biasing of the biased means by the alternating voltage to produce a flow of current only for signals greater than a particular amplitude and only in the alternate half cycles for a return of the biased means to cut-off in the other half cycles and for a discrimination between the bodies with the first particular colors and the bodies with the second particular colors.

16. The combination set forth in claim 15 in which the biased means includes a gas-filled tube having a cathode, a grid and a plate, and in which the tube is coupled to the alternating voltage means to receive an alternating voltage of one polarity on the grid relative to the potential on the cathode and simultaneously in each half cycle to receive an alternating voltage of the opposite polarity on the plate relative to the potential on the cathode.

References Cited in the file of this patent

UNITED STATES PATENTS

| | | |
|---|---|---|
| 2,140,355 | Gulliksen | Dec. 13, 1938 |
| 2,584,327 | Capstach et al. | Feb. 5, 1952 |
| 2,700,321 | Brant et al. | Jan. 25, 1955 |
| 2,708,515 | Bliss | May 17, 1955 |